United States Patent [19]

Bereiter

[11] Patent Number: 5,754,763
[45] Date of Patent: May 19, 1998

[54] SOFTWARE AUDITING MECHANISM FOR A DISTRIBUTED COMPUTER ENTERPRISE ENVIRONMENT

[75] Inventor: Thomas William Bereiter, Austin, Tex.

[73] Assignee: International Business Machines Corporation, Armonk, N.Y.

[21] Appl. No.: 724,659

[22] Filed: Oct. 1, 1996

[51] Int. Cl.$^6$ .................................................... H04L 9/00
[52] U.S. Cl. .......................................... 395/187.01; 380/4
[58] Field of Search ............................ 395/186, 187.01, 395/712; 380/3, 4, 23, 25

[56] References Cited

U.S. PATENT DOCUMENTS

| | | | |
|---|---|---|---|
| 4,924,378 | 5/1990 | Hershey et al. | 395/187.01 |
| 4,937,863 | 6/1990 | Robert et al. | 380/4 |
| 5,023,907 | 6/1991 | Johnson et al. | 380/4 |
| 5,138,712 | 8/1992 | Corbin | 380/4 |
| 5,204,897 | 4/1993 | Wyman | 380/4 |
| 5,260,999 | 11/1993 | Wyman | 380/4 |
| 5,375,206 | 12/1994 | Hunter et al. | 395/712 |
| 5,390,297 | 2/1995 | Barber et al. | 380/4 |
| 5,438,508 | 8/1995 | Wyman | 380/4 |
| 5,553,143 | 9/1996 | Ross et al. | 380/25 |
| 5,579,222 | 11/1996 | Bains et al. | 395/712 |
| 5,671,412 | 9/1997 | Christiano | 395/615 |
| 5,673,315 | 9/1997 | Wolf | 380/4 |

FOREIGN PATENT DOCUMENTS

| | | | |
|---|---|---|---|
| 613073 | 8/1994 | European Pat. Off. | G06F 1/100 |
| WO9301550 | 6/1992 | WIPO | H04L 9/00 |

OTHER PUBLICATIONS

IBM Technical Disclosure Bulletin "Legally Operating and Tracking Software in a LAN Environment", vol. 33 No. 10A Mar. 1991.

IBM Technical Disclosure Bulletin "Software Serial Number", vol. 26, No. 7B Dec. 1983.

IBM Technical Disclosure Bulletin "Counting Users of an Operating System," vol. 38, No. 03, Mar. 1995.

IBM Technical Disclosure Bulletin "Remote Subscription Services," vol. 37 No. 06B, Jun. 1994.

*Primary Examiner*—Albert DeCady
*Attorney, Agent, or Firm*—Jeffrey S. LaBaw; David H. Judson

[57] ABSTRACT

A large distributed enterprise includes computing resources that are organized into one or more managed regions, each region being managed by a management server servicing one or more gateway machines, with each gateway machine servicing a plurality of endpoint machines. A method of auditing software usage in the environment begins by deriving a count of a number of simultaneous method invocations of one or more application programs that occur in response to a system management task. The count is then used to determine whether an authorized number of copies of each application program within the managed region has been exceeded. This protocol obviates a dedicated licensing server.

20 Claims, 5 Drawing Sheets

SOFTWARE AUDITING MECHANISM FOR A DISTRIBUTED COMPUTER ENTERPRISE ENVIRONMENT

TECHNICAL FIELD

The present invention is directed to managing a large distributed computer enterprise environment and, more particularly, to auditing licensed program usage in a manner that does not increase management overhead and that may be carried out without user involvement.

BACKGROUND OF THE INVENTION

It is known in the art to connect computers in a large, geographically-dispersed network environment and to manage such environment in a distributed manner. One such management framework consists of a server that manages a number of nodes, each of which has a local object database that stores object data specific to the local node. Each managed node typically includes a management framework, comprising a number of management routines, that is capable of a relatively large number (e.g., hundreds) of simultaneous network connections to remote machines.

In a network environment such as the one described above, software vendors must in large part rely on the honesty and the diligence of their customers to ascertain the correct number of licenses held by the customer and, therefore, an appropriate amount to be charged to the customer for licensing purposes. As the size and complexity of the distributed network increases, the task becomes more cumbersome and time consuming. Further, in some foreign countries intellectual property rights, namely the right to exclude others from copying or using software, are not even recognized, let alone respected.

The prior art has addressed the problem of managing software licensing in a number of ways. The most common technique is the implementation of a licensing manager or server (or subserver) dedicated to the function of monitoring and controlling access to licensed programs or other content. Another approach is to provide a separate auditing process to aid the user, however, this technique consumes valuable processor time that could be used for other system management tasks. In part because of the lack of efficient technical mechanisms and the widespread amount of illicit copying, several private organizations have been created to "police" unlawful software usage on behalf of owners. The most well-known organizations are the Software Publisher's Association, a non-profit trade association, and the Business Software Alliance, an anti-piracy trade association. Although these organizations are often successful in addressing software piracy and misuse, their very existence points out the inadequacies of prior technical solutions.

Moreover, the solutions provided by the prior art become unmanageable or inordinately expensive as the enterprise increases in size. As companies grow, they desire to place all of their computing resources onto the enterprise network, and this requirement places significant strain on system administrators as the number of computers in the enterprise rises. Moreover, a piece of software may be licensed to a particular machine (a so-called "node" locked arrangement) or the license may "float" between machines (although only as many clients may use the software simultaneously as are permitted under the licenses). As different types of such machines move in and out of a large enterprise network, keeping track of licenses becomes an acute problem. The prior art addresses this problem by adding more system resources to manage license compliance and/or by increasing the complexity of the licensing server. Examples of such prior art approaches are U.S. Pat. Nos. 5,138,712, 5,390,297, 5,438,508 and 5,204,897. The paradigmatic approach of the prior art is thus to increase the complexity and cost of license management.

It would be desirable to have a mechanism that accurately assesses or audits use of licensed software or other content without adding overhead to the system, and preferably without overt action on the user's part.

BRIEF SUMMARY OF THE INVENTION

It is a primary object of the invention to undertake a new approach to software auditing in a large distributed enterprise environment which obviates complex and costly license management schemes of the prior art.

It is another object of the invention to reliably audit usage of licensed software or other content in an enterprise that has placed a large number of its computing resources on a network, without at the same time signficantly increasing system management overhead.

It is a further important object to audit software usage within a large managed network transparently such that users are not directly aware of the license verification activities.

It is still another object of the invention to take advantage of existing system management functionality within a managed enterprise environment to facilitate auditing of licensed software usage as a background process and with little or no increase in systems management overhead.

It is a further important object of the invention to facilitate the protection and enforcement of intellectual property rights within organizations that operate large distributed computer networks, but without resort to costly and complex licensing management mechanisms or techniques.

Another object of the invention is to provide a transparent method of auditing software usage in conjunction with another systems management task.

It is still another important object of the invention to automatically acquire software licensing information as a byproduct of performing other systems management tasks within a managed environment.

It is a more particular object of the invention to take advantage of an existing secure object-oriented system management framework to implement a transparent software licensing audit protocol.

It is still another object to reduce the legal exposure associated with operating licensed software programs within a large enterprise environment by automatically auditing software usage during certain system management operations.

It is still another object of the invention to meet the needs of customers with very large and geographically-dispersed networks and, more particularly, to significantly expand the auditing capabilities of network administrators. By enabling such auditing procedures to be carried out with little or no overhead, the number of expert system administrators may be conveniently reduced.

These and other objects are achieved in a large distributed enterprise that includes computing resources organized into one or more managed regions, each region being managed by a management server servicing one or more gateway machines, with each gateway machine servicing a plurality of endpoint machines. A system management framework is preferably "distributed" on the gateway machines and the one or more endpoint machines to carry out system management tasks. A method of auditing software usage in this network environment takes advantage of the information normally collected during a system management task. This information typically includes the number of nodes of the managed region affected by the system management task and the type of machine located at each affected node. Using this information, a determination is then made of the number of nodes associated with each type of machine. A calculation is then made of the number of software copies of a particular program that are running on the nodes associated with each type of machine. By comparing the calculated number of software copies of the particular program with a given number of software copies of the particular program, the system administrator (or a third party, for example, via a remote connection) may determine whether software usage has exceeded a given authorization. The given number of software copies of the particular program is the number of licensed copies of the particular program operating within the managed region.

According to the invention, information collected during a system management task is used to facilitate software license compliance. Generally, a system management task is initiated by having an object running on a first machine invoke an operation on an object on a second machine. The invocation is secured by an authentication protocol. Preferably, the information used in the software auditing protocol is collected by simply counting the number of simultaneous invocations across the managed region as the system management task is carried out, and then determining whether the count exceeds an authorized number.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
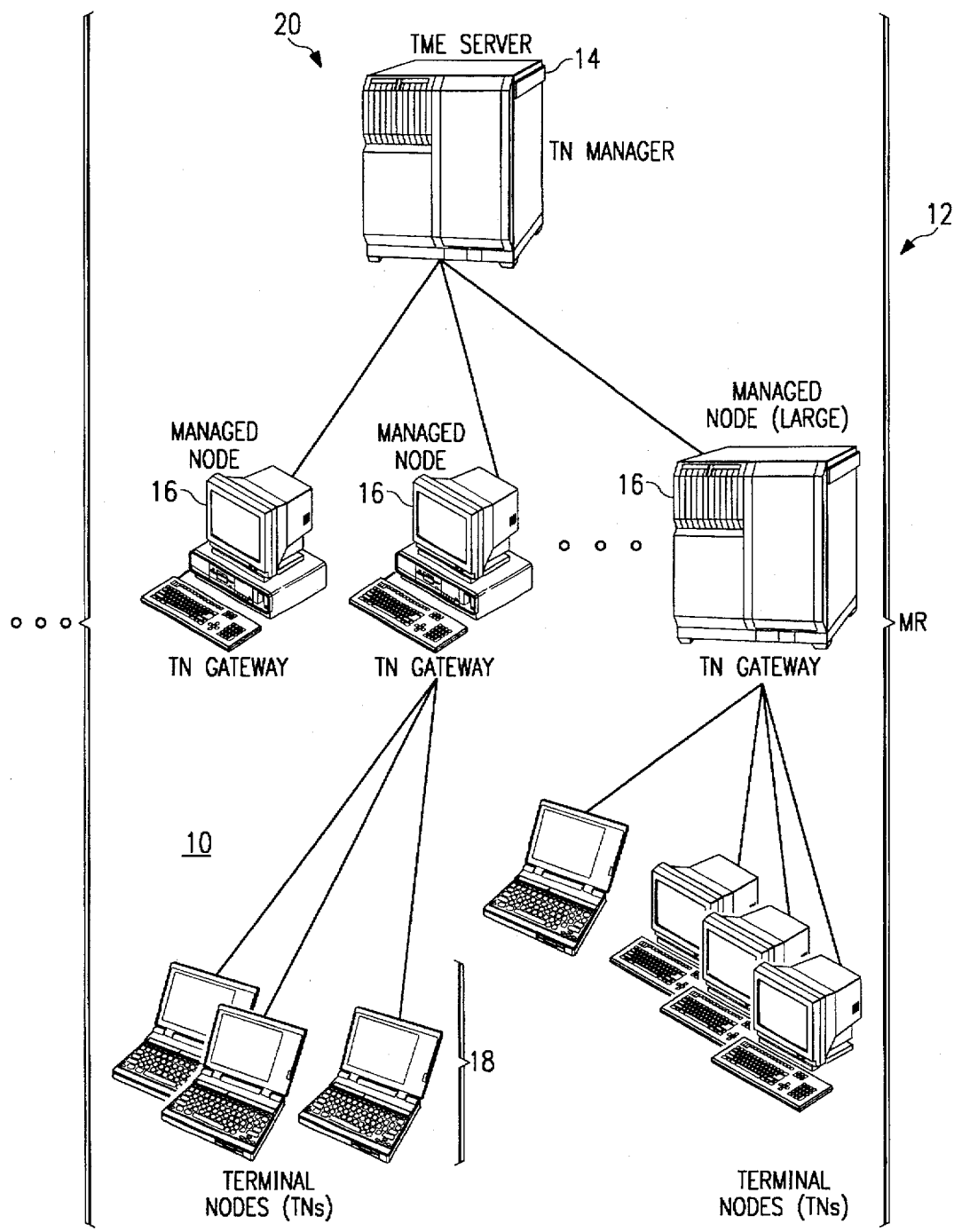
FIG. 1 illustrates a simplified diagram showing a large distributed computing enterprise environment in which the present invention is implemented.

Referring now to FIG. 1, the invention is preferably implemented in a large distributed computer environment 10 comprising up to thousands or even tens of thousands of "nodes." The nodes will typically be geographically dispersed and the overall environment is "managed" in a distributed manner. Preferably, the managed environment (ME) is logically broken down into a series of loosely-connected managed regions (MR) 12, each with its own management server 14 for managing local resources with the MR. The network typically will include other servers (not shown) for carrying out other distributed network functions. These include name servers, security servers, file servers, threads servers, time servers and the like. Multiple servers 14 coordinate activities across the enterprise and permit remote site management and operation. Each server 14 serves a number of gateway machines 16, each of which in turn support a plurality of "endpoints" 18. The server 14 coordinates all activity within the MR using a terminal node manager 20.

Figure 2:
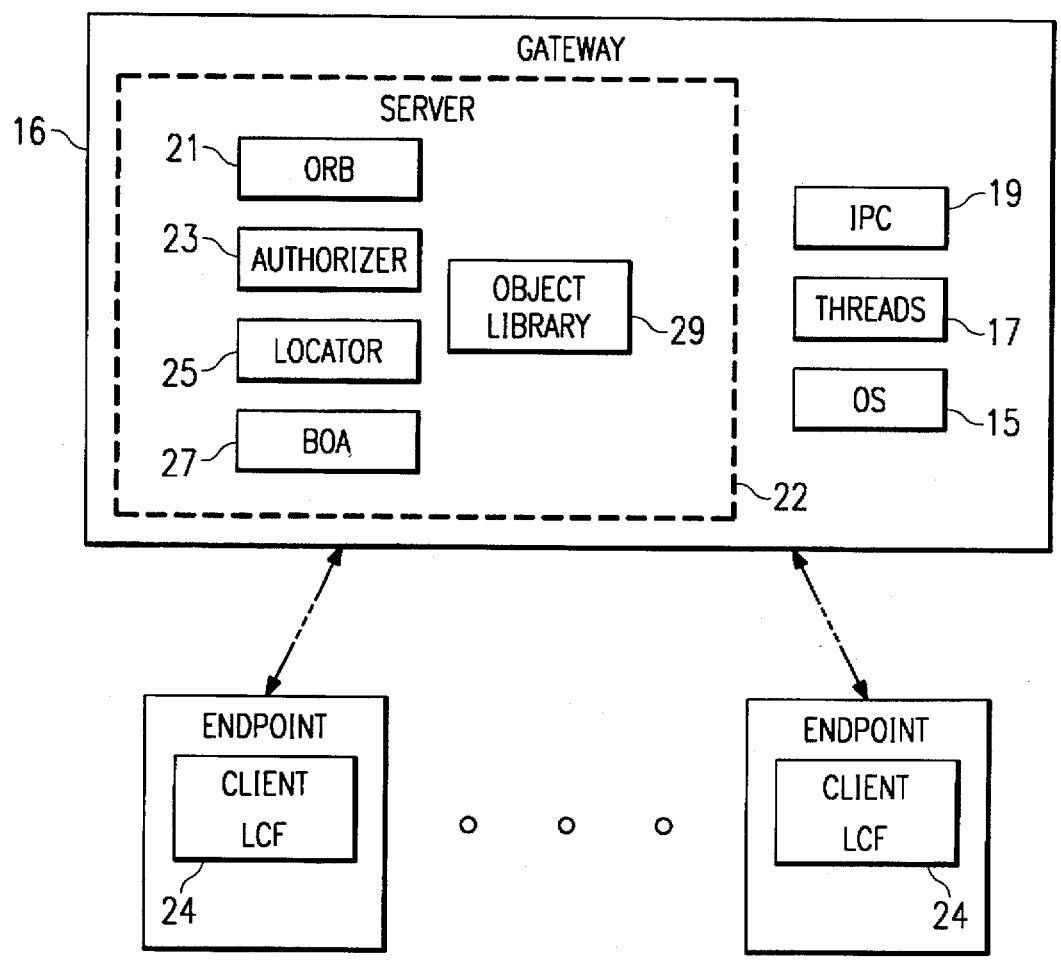
FIG. 2 is a block diagram of a preferred system management framework illustrating how the framework functionality is distributed across the gateway and its endpoints within a managed region.
Figure 2A:
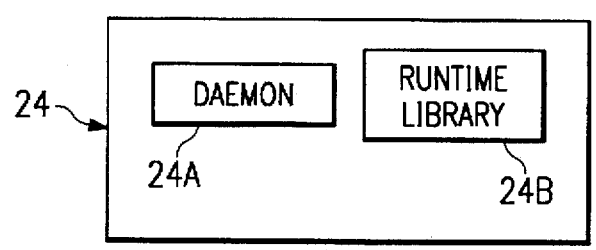
FIG. 2A is a block diagram showing the two parts of the LCF shown in FIG. 2.

Referring now to FIG. 2, each gateway machine 16 runs a server component 22 of a system management framework. The server component 22 is multi-threaded runtime process that comprises several components: an object request broker or "ORB" 21, an authorization service 23, object location service 25 and basic object adaptor or "BOA" 27. Server component 22 also includes an object library 29. Preferably, the ORB 21 runs continuously, separate from the operating system, and it communicates with both server and client processes through separate stubs and skeletons via an interprocess communication (IPC) facility 19. In particular, a secure remote procedure call (RPC) is used to invoke operations on remote objects. Gateway machines 16 also includes an operating system 15 and a threads mechanism 17.

The system management framework includes a client component 24 supported on each of the endpoint machines 18. The client component 24 is a low cost, low maintenance application that is preferably "dataless" in the sense that system management data is not cached or stored there in a persistent manner. System management data is information collected or distributed as a result of a system management task. Implementation of the management framework in this "client-server" manner has significant advantages over the prior art, and it facilitates the connectivity of personal computers into the managed environment. Using an object-oriented approach, the system management framework facilitates execution of system management tasks required to manage the resources in the managed region. Such tasks are quite varied and include, without limitation, file and data distribution, network usage monitoring, user management, printer or other resource configuration management, and the like.

Figure 3:
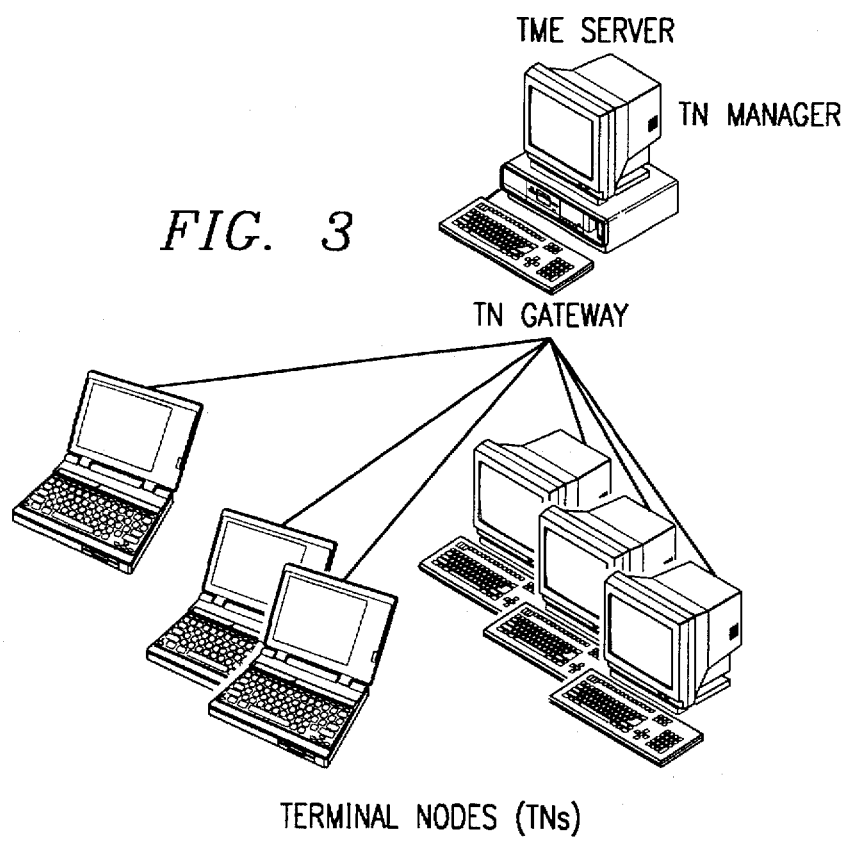
FIG. 3 illustrates a smaller "workgroup" implementation of the enterprise in which the server and gateway functions are supported on the same machine.

In the large enterprise such as illustrated in FIG. 1, preferably there is one server per MR with some number of gateways. For a workgroup-size installation (e.g., a local area network or "LAN") such as illustrated in FIG. 3, a single server-class machine may be used as the server and gateway. References herein to a distinct server and one or more gateway(s) should thus not be taken by way of limitation as these elements may be combined into a single platform. For intermediate size installations the MR grows breadth-wise, with additional gateways then being used to balance the load of the endpoints.

The server is the top-level authority over all gateway and endpoints. The server maintains an endpoint list, which keeps track of every endpoint in a managed region. This list contains all information necessary to uniquely identify and manage endpoints including, without limitation, such information as name, location, and machine type. The server also maintains the mapping between endpoint and gateway, and this mapping is dynamic. Based on site-specific settings, it is possible to reassign endpoints when gateways go down or to automatically add new endpoints as they appear on the network.

As noted above, there are one or more gateways per managed region. A gateway is a full managed node that has been configured to operate as a gateway. Initially, a gateway "knows" nothing about endpoints. As endpoints login (discussed below), the gateway builds an endpoint list for its endpoints. The gateway's duties include: listening for endpoint login requests, listening for endpoint upcall requests, and (its main task) acting as a gateway for method invocations on endpoints.

As also discussed above, the endpoint is a machine running the system management framework client component, which is referred to herein as the low cost framework (LCF). The LCF has two main parts: the LCF daemon and an application runtime library. The LCF daemon is responsible for endpoint login and for spawning application endpoint executables. Once an executable is spawned, the LCF daemon has no further interaction with it. Each executable is linked with the application runtime library, which handles all further communication with the gateway.

Preferably, the server and each of the gateways is a computer or "machine." For example, each computer may be a RISC System/6000® (a reduced instruction set or so-called RISC-based workstation) running the AIX (Advanced Interactive Executive) operating system, preferably Version 3.2.5 or greater. The AIX operating system is compatible at the application interface level with the UNIX operating system, version 5.2.

The various models of the RISC-based computers are described in many publications of the IBM Corporation, for example, *RISC System/6000, 7073 and 7016 POWERstation and POWERserver Hardware Technical Reference, Order No. SA23-2644-00*. The AIX operating system is described in *AIX Operating System Technical Reference*, published by IBM Corporation, First Edition (November, 1985), and other publications. A detailed description of the design of the UNIX operating system is found in a book by Maurice J. Bach, *Design of the Unix Operating System*, published by Prentice-Hall (1986). Suitable alternative machines include: an IBM-compatible PC 486 or higher running Novell Unix-Ware 2.0, an AT&T 3000 series running AT&T UNIX SVR4 MP-RAS Release 2.02 or greater, Data General AViiON series running DG/UX version 5.4R3.00 or greater, an HP9000/700 and 800 series running HP/UX 9.00 through HP/UX 9.05. Motorola 88K series running SVR4 version R40V4.2, a Sun SPARC series running Solaris 2.3 or 2.4, or a Sun SPARC series running SunOS 4.1.2 or 4.1.3. Of course, other machines and/or operating systems may be used as well for the gateway and server machines.

Each endpoint is also a computer. In one preferred embodiment of the invention, most of the endpoints are personal computers (e.g., desktop machines or laptops). In this architecture, the endpoints need not be high powered or complex machines or workstations. One or more of the endpoints may be a notebook computer, e.g., an IBM ThinkPad® machine, or some other Intel x86 or Pentium®-based computer running Windows 3.1 or greater operating system. IBM® or IBM-compatible machines running under the OS/2® operating system may also be implemented as the endpoints. For more information on the OS/2 operating system, the reader is directed to *OS/2 2.0 Technical Library, Programming Guide Volumes 1–3 Version 2.00*, Order Nos. 10G6261, 10G6495 and 10G6494.

As noted above, the server-class framework running on each gateway machine is multi-threaded and is capable of maintaining hundreds of simultaneous network connections to remote machines. A thread of execution may be a separate process (in the UNIX paradigm) or a separate thread in a single process (in the POSIX pthreads paradigm). POSIX is a series of standards for applications and user interfaces to open systems, issued by the Institute of Electrical and Electronics Engineers Inc. (IEEE). The IEEE POSIX.1c is the emerging standard for user level multi-threaded programming and is implemented in the served component of the systems management framework. All objects in this framework exhibit "state." This state may be completely persistent, in which case it is represented by attributes in the object database associated with a gateway machine, or the state may be non-persistent. An example of the latter might be the current list of machines that are down.

As noted above, the client-class framework running on each endpoint is a low-maintenance, low-cost framework (LCF) that is ready to do management tasks but consumes few machine resources (because it is normally in an idle state). This architecture advantageously enables a rational partitioning of the enterprise with 10's of servers, 100's of gateway machines, and 1000's of endpoints. Each server typically serves up to 200 gateways, each of which services 1000's of endpoints. At the framework level, all operations to or from an endpoint pass through a gateway machine. In many operations, the gateway is transparent; it receives a request, determines the targets, resends the requests, waits for results, then returns results back to the caller. Each gateway handles multiple simultaneous requests, and there may be any number of gateways in an enterprise, with the exact number depending on many factors including the available resources and the number of endpoints that need to be serviced.

Figure 4:
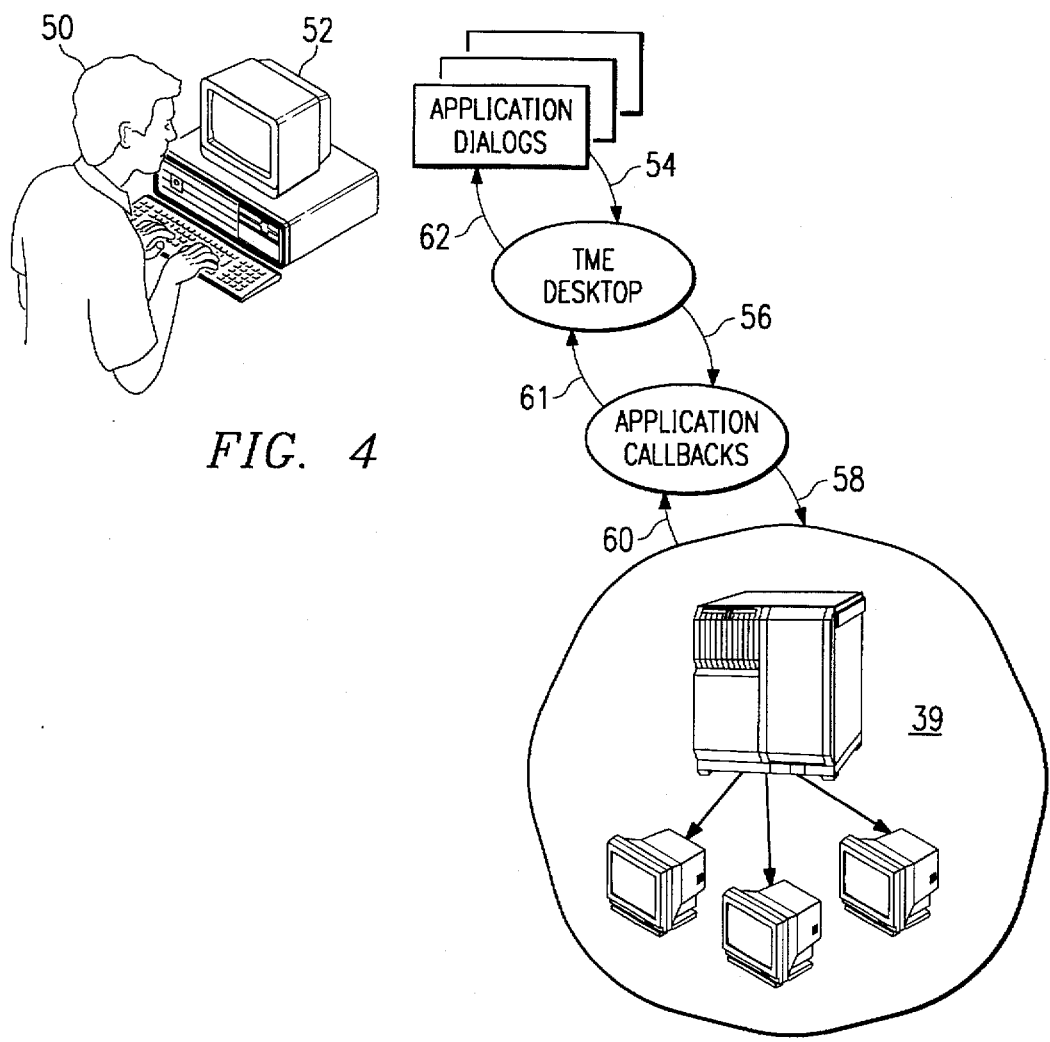
FIG. 4 shows a simplified representation of how a system administrator implements a system management task.

FIG. 4 illustrates how a systems management task is implemented. Each authorized administrator 50 has access to a desktop computer 52 containing one or more icons representing system resources. As administrators interact with dialog screens and menus available from these icons, they are able to change system configurations and create new resources in the distributed environment, all in a known manner. In particular, when administrator 50 interacts with the desktop, so-called "callbacks" are invoked from the user interface on underlying objects representing some system resource or component. These callbacks are translated into a series of method invocations that actually perform the work and return and results or status to the administrator.

In particular, and with reference to the process flow diagram of FIG. 4, the information flow begins when the administrator 50 selects an icon or interacts with a dialog. The information is then sent to the desktop (usually located at a gateway) at step 54, at which time the appropriate application callback method is invoked at step 56. The callback method then invokes core application methods at step 58, which communicate with the application object(s) to perform some system management operation, as illustrated at step 39. Any return information or state is passed back at steps 60 and 61. If an update to the user interface is required, the desktop 52 interprets the output and updates the dialogs on the administrator's desktop at step 62.

Preferably, the framework includes a task library that enables administrators to create "shell" scripts that can run an any managed node of the enterprise environment. A shell script integrated with a managed node is called a "task." When administrators want to create a task, they provide a machine and a path to an executable file. The executable can be a shell script, a specialized script, a compiled program or any other kind of valid executable. When a task is created, the executable is stored as an attribute in an object database associated with a gateway machine. When the task is needed, the executable file is retrieved from the attribute and is provided to one or more managed nodes. After a task is created, it is added to the task library and displayed as an icon.

As referenced above, the systems management provides an implementation of a CORBA 1.1 Object Request Broker (ORB), basic object adaptor (BOA), and related object services. CORBA 1.1 is a specification for an object-oriented distributed computer systems management architecture provided by The Object Management Group (OMG), a non-profit association of more than 300 companies. CORBA describes the use of the Object Request Broker (ORB) and basic object adaptor (BOA) that provide a mechanism for object invocation and return of results. The specification defines interfaces to a set of low-level object services and enables such services to be integrated in many different language and systems using object encapsulation, service requestor/provider isolation, and interface and implementation separation.

Figure 5:
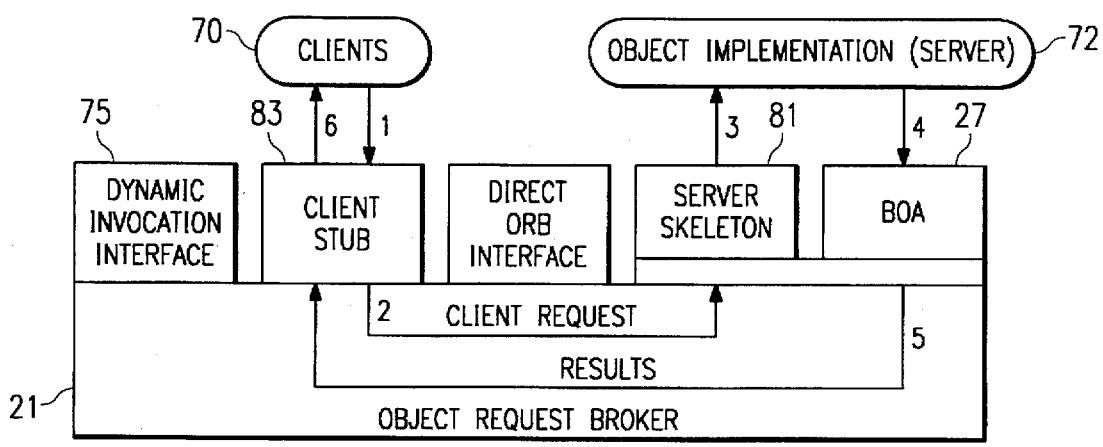
FIG. 5 illustrates the ORB/BOA object-invocation mechanism used by the present invention.

In a generic CORBA 1.1 implementation as seen in FIG. 5, there are three primary components: a client, an object implementation, and the ORB/BOA. The client 70 is the requestor of a service that is provided by an object implementation 72. The ORB 21 delivers the request from the client 70 to the object implementation 72 through the BOA 27. The object implementation 72 then performs the requested service, and any return data is delivered back to the client. The client and object implementation are isolated from each other, and neither has any knowledge of the other except through their ORB/BOA interfaces. Client requests are independent of the object implementation location and the programming language in which they are implemented.

The ORB delivers the request to the BOA, which activates the process under which the object implementation (e.g., a server) runs. The BOA then invokes the method associated with the request by way of a server skeleton 81. When the method is finished, the BOA manages the termination of the method and coordinates the return of any results to the client. Alternatively, if a request is unknown until runtime, a Dynamic Invocation Interface (DII) 75 is used to build a request used in place of a client stub 83 linked at compile time.

The ORB 21 uses a secure remote procedure call (RPC) service that provides secure peer-to-peer communication between ORBs when an operation is invoked on a remote object. The communication service provided within the ORB uses a virtual transport layer residing on top of the specific service in use. This transport layer can consist of either domain sockets or TLI. In the managed environment, an application preferably is not aware of the particular protocol in use. This is because an application invokes an operation on an object by either calling the client stub or through the use of the DII 75 to build a request.

Figure 6:
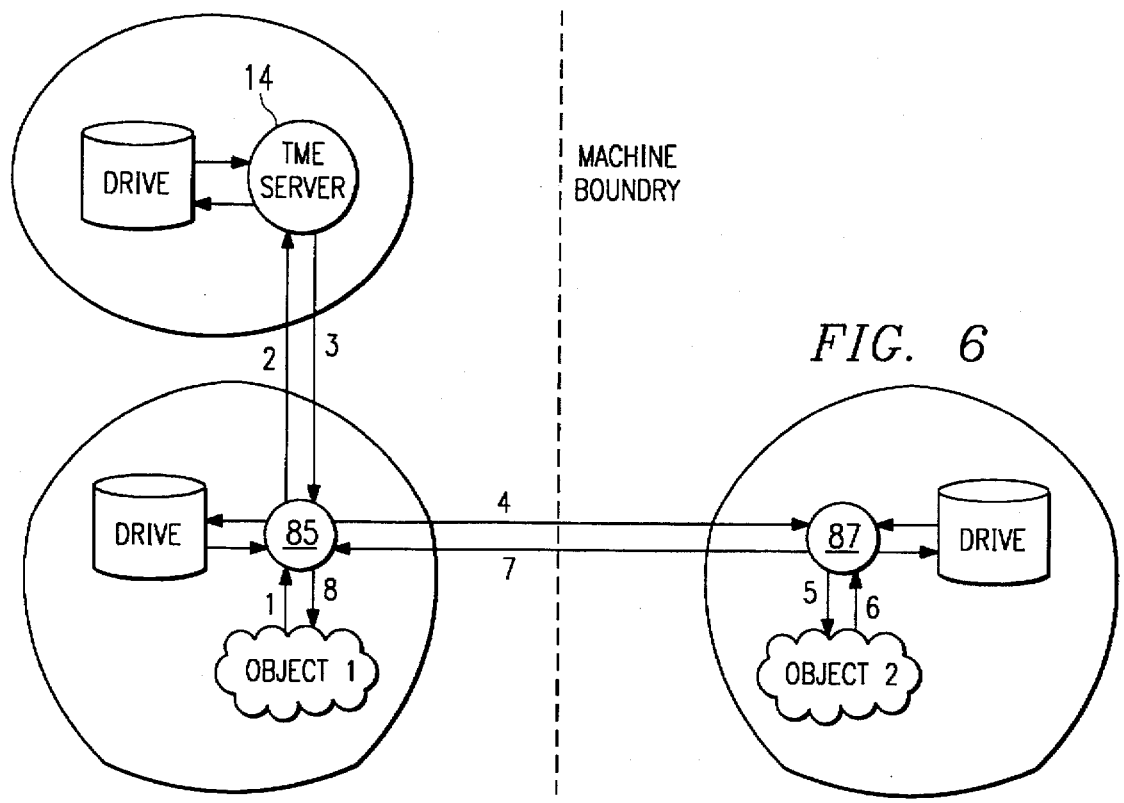
FIG. 6 illustrates a method invocation across machine boundaries during a system management task.

FIG. 6 depicts the interaction between two ORBS 85 and 87 when an object on one machine invokes an operation on an object on a remote machine. When a method of object 1 invokes the client stub of a method of object 2, a message is sent to ORB 85. The message specifies the method, object, and arguments of the request (step 1). ORB 85 communicates with the management server 14 for the managed region to determine whether the principal is authorized to invoke the operation on object 2 (step 2). If the principal is authorized to invoke the operation, the service also determines the location of object 2 and resolves any implementation inheritance as necessary. This information is then returned to ORB 85 in a cryptographically-sealed credentials package (step 3). ORB 85 then forwards the request to ORB 87 (step 4) which, in turn, invokes the desired method of object 2 (step 5). When the method completes, the results are passed back to ORB 87 (step 6), which returns them to ORB 85 (step 7). Finally, the results are delivered to the invoking object (step 8).

The managed environment thus uses secure methods to invoke objects across machine boundaries. There are two aspects of this security service, authentication and authorization. Authentication verifies the identity of a "principal." A fake identity on the network allows a vandal access to data or resources that are normally unavailable. A password that a user must enter when logging into a system is an example of an authentication mechanism. Preferably, the network environment uses a known "Kerberos" scheme for authentication. Authorization verifies that an identified principal has sufficient privilege to perform a specific operation. Each method has an associated set of roles that control access to the method. For any operation on an object, the authorization process verifies that the principal has at least one of the roles required by the method. If so, the attempt to run an operation is permitted. If not, it is refused.

In Kerberos authentication schemes, an authentication service uses a key shared between a user's workstation and the server to encrypt a "ticket" that, upon successful decryption by a workstation, gives the workstation the ability to access services in the network. The shared key used to encrypt the ticket is based on the user's password. The authentication service knows the password because it is stored there; the workstation learns the password because the user types it in at login. Typically, a one-way hash of the password is used to form the shared key since the password is an alphanumeric string and the key is usually a number.

Figure 7:
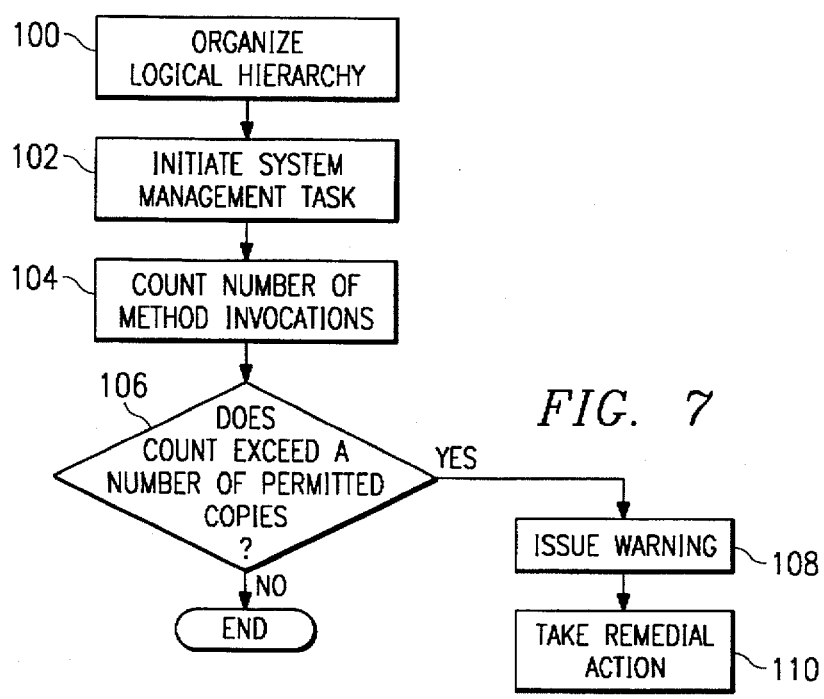
FIG. 7 is a flowchart showing a high level protocol for auditing application program usage during a particular system management task.

According to the present invention as illustrated in the flowchart of FIG. 7, the managed environment is first organized into a logical "hierarchy" as illustrated in FIG. 1. This is step 100 in the flowchart. At step 102, a system management task is initiated. During the execution of a system management task, an object supported on a first machine (e.g., an endpoint) invokes an object located on a second machine (e.g., a gateway), or vice versa. Method invocations are carried out in a secure manner, using a remote procedure call or some similar mechanism. As a management task is effected, the number of method invocations (for the program being used to carry out the task) is counted at step 104. Conveniently, this count provides a simple way of determining whether an authorized number of software copies (of a particular program) are running in the system. Thus, for example, assume the system management task in question is carried out using a software application and that the organization (including all endpoints) is licensed to have 500 copies of that application. Upon execution of the system management task that affects all endpoints, the number of method invocations of the software application should equal the number of authorized copies. At step 106 then, a test is made to determine if the number of particular method invocations exceeds the number of authorized copies of the program in question. If the outcome of the test at step 106 is affirmative, then an authorized usage has been located and the routine continues at step 108 to issue a warning to the system administrator. Remedial action may then be taken at step 110. If the outcome of the test at step 106 is negative, then the routine terminates with respect to the particular invocation.

The method may be carried out either on-line, i.e. during the execution of a particular system management task, or off-line, i.e. in response to a user-entered audit command. If more than one application program is used to perform the system management task, preferably the number of method invocations per program are counted for auditing purposes. The method may be invoked each time a particular system management task is invoked or at user-selected intervals. The command may be provided by a system administrator (such as discussed above) or it may be effected remotely, e.g., by one or more software owners whose software is running in the managed environment. The off-line mode of operation may be conveniently used to run an audit of all licensed software in the managed environment in a "batch" mode.

Of course, the number of method invocations (counted during execution of a system management task) may be parsed in any convenient manner to determine the number of endpoint (or other machines) running the application and the type of machine in question. This "type" information may be suitably organized in any convenient manner to provide the administrator with a list of each type of machine (e.g., DOS, Windows 95, etc.) that effects the method invocation. With such information, the system administrator, or a third party who may access the network remotely, may determine whether unauthorized software usage is occurring in the managed network. Such unauthorized usage may then be rectified through the appropriate purchase of additional licenses or other remedial techniques.

System management tasks in the enterprise environment may be either client or server-initiated. Using the example of software distribution, a client-initiated operation would be an endpoint requesting a particular software package. A server-initiated operation would be a server pushing the same software package to a set of endpoints. Many endpoints can make requests at the same time, in which case the total number of active requests at any given time is the count of simultaneous uses. For server-initiated operations, the count is the number of clients specified by the server as targets of the push.

The audit management provided by the present invention may involve "node locked" or "floating" licenses. In the node locked case, a client machine is either licensed to use a piece of software or is not licensed. In the case of a floating license, any client may use a piece of software, but only as many clients may use the software simultaneously as there are floating licenses. In a node-locked case, when the licensed software is installed, the particular machine on which the software is then installed (which may differ) is designated as "owner" for each license. When a client initiates an operation involving that software, it succeeds only if the client owns a license. When a server initiates an operation on a client endpoint involving that software, the client is checked to ensure that it owns a license. This may be done by verifying that a particular client is in a list of "licensed" endpoints (with respect to the software).

Floating licenses may be handled in a different manner. Each time a particular system management operation is initiated, a check is made to the server to authorize the operation and to locate the target(s) of the operation. Each operation may be associated with an application. If the application uses some licensed software, the server counts the number of operations started. When this number exceeds the license limit, appropriate notifications can be given to the system administrator. When the operation completes, the system management framework sends an "operation complete" message to the server. It is then a simple matter for the server to keep a count of the number of simultaneous operations. This count is then compared to the number of floating licenses.

If the system management framework does not issue an operation complete message, an alternative approach would be to define the number of simultaneous uses to be the number of uses within a particular time window, and then note the time at which each operation starts. The server then, in effect, generates its own "operation complete" message at some specific time after each operation starts.

For server-initiated operations, a list of client endpoints is created. This allows a simple optimization of the above-described counting scheme. In particular, since the operation is invoked on each client in the list, the length of the list can be assumed to be the desired number of simultaneous invocations. If this number were then to exceed the number of floating licenses, then appropriate notifications are given.

As can be seen, the present invention takes advantage of existing system management functionality within a managed large enterprise environment to facilitate auditing of licensed software usage. It thus implements a new "paradigm" for auditing (or taking an inventory) of software licenses that does not involve complex and costly licensing mechanisms.

The managed environment includes a logical hierarchy comprising a management server that services one or more gateways that, in turn, manage sets of one or more endpoint machines. The network "topology" may change on a frequent basis as endpoint machines (e.g., personal computers such as notebook computers) move in and out of the particular network configuration even within a given day. Preferably, the audit protocol is performed as a background process during a conventional system management task when method invocations cross machine boundaries, although this preferred operation is not meant to be limiting. This approach thus provides a simple auditing mechanism without resort to a dedicated server or subserver, and with little or no increase in systems management overhead. The invention thus facilitates the protection and enforcement of intellectual property rights within organizations that operate large distributed computer networks. The technique of automatically acquiring software licensing information as a byproduct of performing other systems management tasks within a managed environment is advantageous in that in reduces an organization's legal exposure and facilitates license compliance. The invention takes unique advantage of an existing secure object-oriented system management framework to implement the transparent software licensing audit protocol, preferably by counting the number of method invocations across the distributed environment when a particular application is used.

One of the preferred implementations of the client component of the system management framework (including the auditing mechanism) is as a set of instructions in a code module resident in the random access memory of the endpoint. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims. The present invention, however, is not to be construed as limited to auditing of just licensed software programs, as other type of content (e.g., data files) may be auditing in a similar manner. Also, while in the preferred embodiment the auditing protocol is effected by counting method invocations of a particular application program, this is not a limitation of the invention either. Moreover, the inventive auditing technique should be useful in any distributed network environment.

Having thus described my invention, what I claim as new and desire to secure by Letters Patent is set forth in the following claims:

I claim:

1. A method of auditing software usage in a managed network environment wherein computing resources are logically organized into one or more managed regions, each region being managed by a management server servicing one or more gateway machines, each gateway machine servicing a plurality of endpoint machines, comprising the steps of:

responsive to a system management task, collecting information about a number of nodes of the managed region affected by the system management task and the type of machine located at each affected node; and using the information to audit software usage in the managed network.

2. The method as described in claim 1 wherein the step of using the information to audit software usage includes the steps of:

determining the number of nodes associated with each type of machine; and calculating a number of software copies of a particular program that are running on the nodes associated with each type of machine.

3. The method as described in claim 2 further including the step of comparing the calculated number of software copies of the particular program with a given number of software copies of the particular program to determine whether software usage has exceeded a given authorization.

4. The method as described in claim 3 wherein the given number of software copies of the particular program is the number of licensed copies of the particular program operating within the managed region.

5. The method as described in claim 1 wherein the information is used by a system administrator of the managed region to audit software usage.

6. The method as described in claim 1 wherein the information is used by a third party that remotely accesses the managed region to audit software usage.

7. The method as described in claim 1 wherein the system management task is initiated by having an object running on a first machine invoke an operation on an object on a second machine.

8. The method as described in claim 7 wherein the invocation is secured by an authentication protocol.

9. The method as described in claim 8 wherein the information is collected by counting a number of invocations across the managed region as the system management task is carried out.

10. The method as described in claim 1 wherein the endpoint machines include at least some personal computers that are relocatable within the managed region.

11. A method of auditing software usage in a managed network environment wherein computing resources are logically organized into one or more managed regions, each region being managed by a management server servicing one or more gateway machines, each gateway machine servicing a plurality of endpoint machines, comprising the steps of:

deriving a count of a number of simultaneous method invocations of a given application program that occur in response to a system management task; and using the count to determine whether an authorized number of copies of the application program within the managed region has been exceeded.

12. The method as described in claim 11 wherein the step of using the count includes the steps of:

comparing the count with the authorized number of copies; and issuing a notification when the count exceeds the authorized number of copies.

13. The method as described in claim 11 wherein the method invocations occur across machine boundaries in the managed region.

14. The method as described in claim 13 wherein an invocation is secured by an authentication protocol.

15. In a large distributed enterprise wherein computing resources are organized into one or more managed regions, each region being managed by a management server servicing one or more gateway machines, each gateway machine servicing a plurality of endpoint machines, a method of auditing software usage without a dedicated licensing server, comprising the steps of:

deriving a count of a number of simultaneous method invocations of one or more application programs that occur in response to a system management task; and using the count to determine whether an authorized number of copies of each application program within the managed region has been exceeded.

16. In the method of claim 15, wherein the step of using the count includes the steps of:

comparing the count with the authorized number of copies; and issuing a notification when the count exceeds the authorized number of copies.

17. In the method of claim 16, wherein the method invocations occur across machine boundaries in the managed region.

18. A computer connectable into a large distributed enterprise wherein computing resources are organized into one or more managed regions, each region being managed by a management server servicing one or more gateway machines, each gateway machine servicing a plurality of endpoint machines, the computer comprising:

a processor;

an operating system; and an audit mechanism, comprising:

means for deriving a count of a number of simultaneous method invocations of a given application program that occur in response to a system management task; and means for using the count to determine whether an authorized number of copies of the application program within the managed region has been exceeded.

19. The computer as described in claim 18 wherein the computer also includes an object-oriented system management framework for managing the method invocations.

20. A computer program product for use in a computer having a processor, an interface, a memory, the computer connectable into a large distributed enterprise wherein computing resources are organized into one or more managed regions, each region being managed by a management server servicing one or more gateway machines, each gateway machine servicing a plurality of endpoint machines, the computer program product comprising:

a computer-readable storage medium having a substrate; and program data encoded in the substrate of the computer-readable storage medium, wherein the program data comprises:

means for deriving a count of a number of simultaneous method invocations of a given application program that occur in response to a system management task; and means for using the count to determine whether an authorized number of copies of the application program within the managed region has been exceeded.

* * * * *